Figure 1:
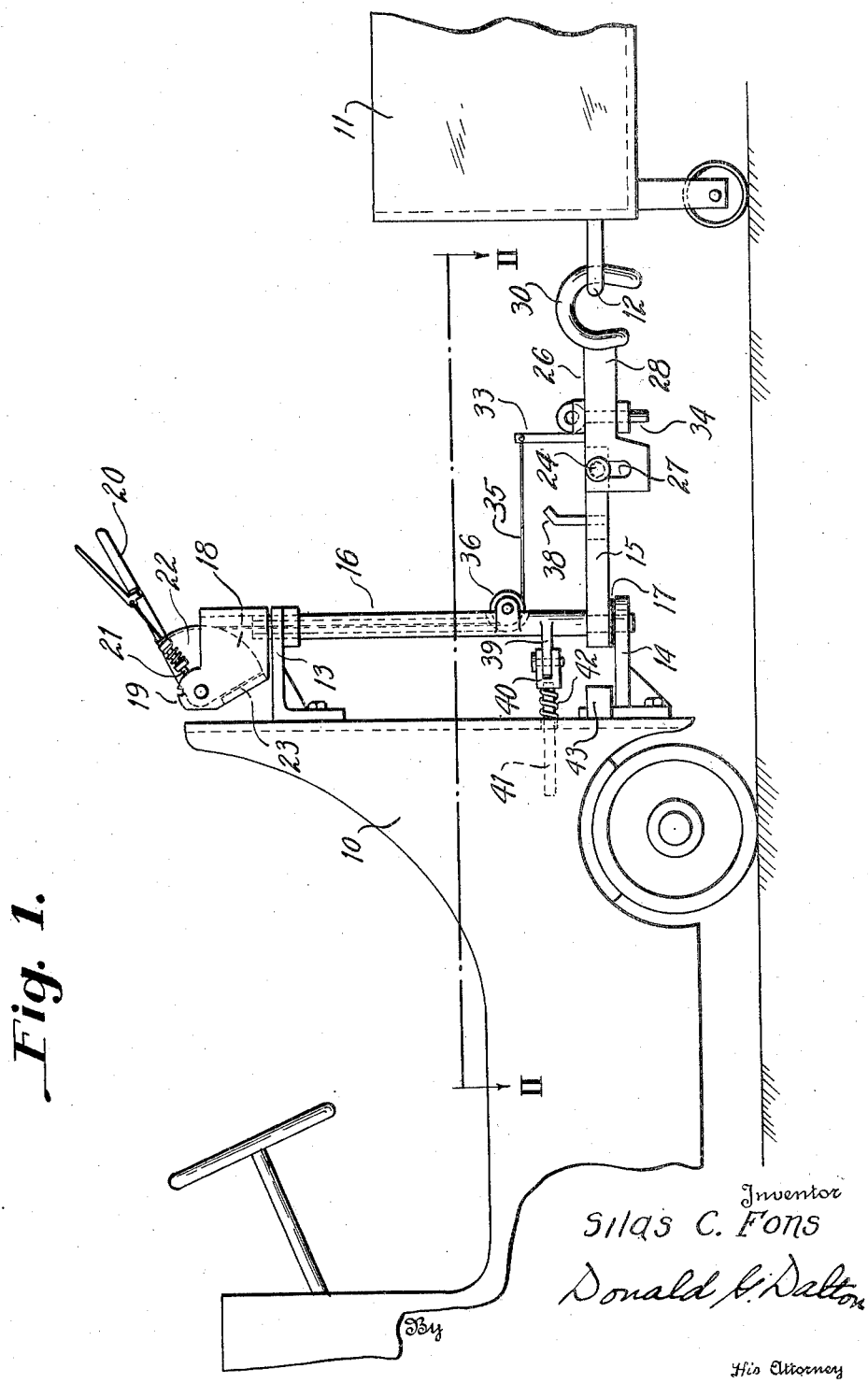

Dec. 20, 1949　　　　　S. C. FONS　　　　　2,491,963
TOWING VEHICLE COUPLING MECHANISM
Filed July 16, 1947　　　　　　　　　　　　2 Sheets-Sheet 1

Inventor
Silas C. Fons
By Donald G. Dalton
His Attorney

Dec. 20, 1949            S. C. FONS            2,491,963
TOWING VEHICLE COUPLING MECHANISM
Filed July 16, 1947            2 Sheets-Sheet 2
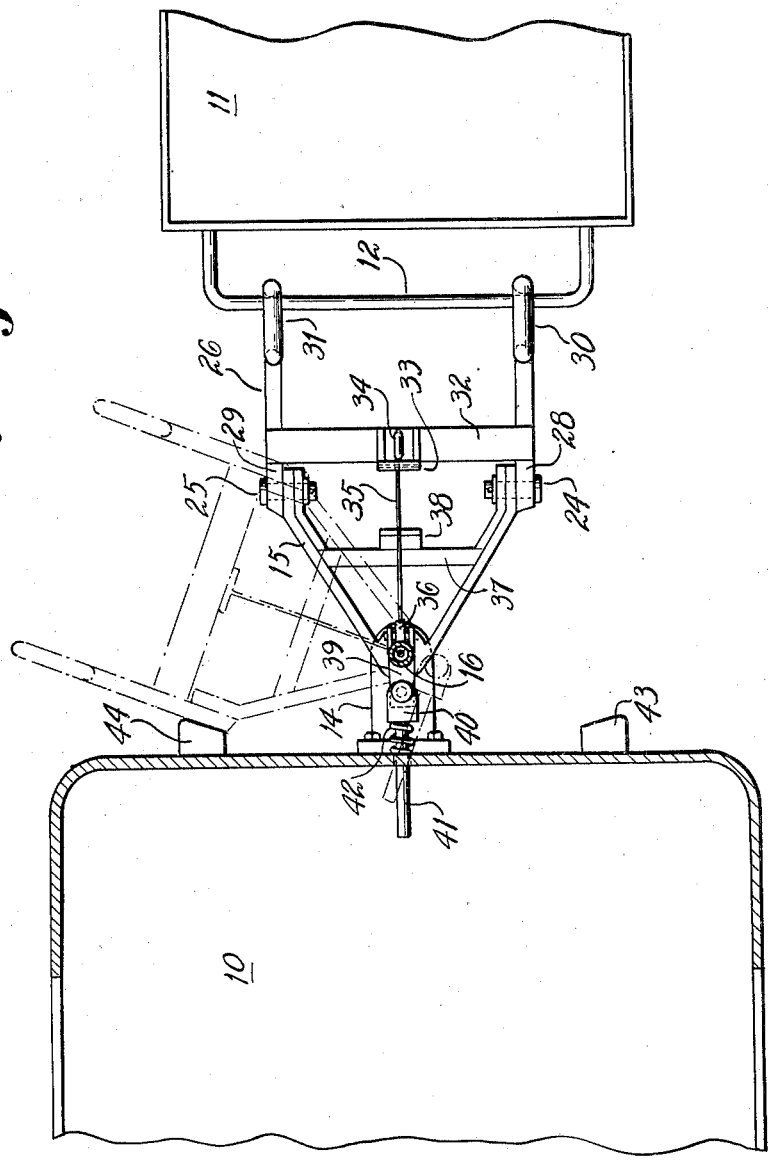
Inventor
Silas C. Fons
By Donald G. Dalton
His Attorney Patented Dec. 20, 1949

2,491,963

UNITED STATES PATENT OFFICE 2,491,963

TOWING VEHICLE COUPLING MECHANISM

Silas C. Fons, Waukegan, Ill., assignor to The American Steel and Wire Company of New Jersey, a corporation of New Jersey Application July 16, 1947, Serial No. 761,211

8 Claims. (Cl. 280—33.15)

This invention relates to towing vehicles and particularly to improved coupling mechanisms embodied in such vehicles.

An object of the invention is to provide in towing vehicles improved couplings operable from a driver's position in the vehicle for engagement or disengagement with a tow and for adjustment with respect to the tow.

Further objects of the invention are to provide in towing vehicles improved couplings manually adjustable about a vertical axis, whereby the towing vehicle need not be square with the tow for effecting engagement or disengagement thereof; to provide improved couplings in which a single operating lever effects engagement or disengagement with a tow, adjustment about a vertical axis and adjustment of coupling height; and to provide improved couplings having the foregoing characteristics and which are automatically moved to an out-of-the-way position when not in use.

In accomplishing these and other objects of the present invention I have provided improved details of structure, a preferred form of which is shown in the accompanying drawings, wherein:

Figure 1 is a side elevational view of a portion of a towing vehicle having an improved coupling embodying features of the present invention installed thereon and engaging a tow; and Figure 2 is a horizontal sectional view of the coupling taken substantially on line II—II of Figure 1.

Referring more in detail to the drawings:

In Figure 1 there is shown a towing vehicle 10, such as a tractor or the like, and a truck 11 having a laterally extending bar 12 for engagement by a coupling for towing purposes. The towing vehicle and truck, apart from the improved coupling, are not per se part of the present invention, and hence are not described in detail.

The coupling of the present invention is carried at the rear face of vehicle 10 on an upper bracket 13 and a lower bracket 14. The mounting and operating mechanism of the coupling comprises a yoke 15 having an upright hollow stem 16 rigidly affixed thereto. The stem and yoke assembly is pivoted between brackets 13 and 14 for movement on a vertical axis. Preferably an anti-friction thrust bearing 17 is interposed between said yoke and the top of bracket 14 to facilitate pivotal movement.

A segment head 18 is rigidly affixed to the upper end of stem 16 above bracket 13 and carries an arcuate notched rack 19 integral therewith. An operating lever 20 is pivoted to said head for movement on a horizontal axis at the rack center and carries a retractable detent 21 cooperable with the notch of said rack for fixing said lever in upper position. Said lever also carries a sheave sector 22 integral therewith and segment head 18 carries a stop 23 with which the lower edge of said sheave sector is engageable to limit downward movement of said lever.

As best shown in Figure 2, yoke 15 is preferably of V-outline. The outer ends of the V are bent into parallel relation and apertured to receive bearing studs 24, 25. A coupling frame 26 is pivoted to said studs, the studs preferably being received in slots 27 in the frame, whereby said frame may assume a height corresponding with the height of bar 12. The coupling frame is of any suitable design for engagement with the engaging means on the truck, being shown as including a pair of shanks 28, 29 having bar engaging hooks 30, 31 at their rearward ends and connected by a cross bar 32. Said cross bar carries an upright bracket 33, and may be apertured to receive a pin 34 for engaging trucks that have extending handles, rather than bars such as 12.

Upright bracket 33 is operatively connected with lever 20 by a flexible cable 35, whereby pivotal movement of said lever pivots coupling frame 26 about studs 24, 25. Cable 35 is attached to lever 20 at the edge of sheave sector 22, whereby on raising said lever the cable is wound on said sector and thereby lifted. The cable extends vertically through the bore of stem 16 and horizontally to bracket 33. A guide sheave 36 is rotatably mounted in suitable bearings on the stem for guiding cable 35 at the bend therein.

Yoke 15 preferably has a cross bar 37 (Figure 2) that carries a stop 38. Upright bracket 33 is engageable with said stop for limiting pivotal movement of the coupling frame on raising of lever 20.

Stem 16 carries a forwardly extending bracket 39 to which a bearing 40 of a spindle 41 is pivoted. Said spindle extends loosely through an enlarged aperture in the rear face of the tractor. A compression spring 42 is interposed between the tractor face and bearing 40 and tends to force said spindle rearwardly, thereby rotating stem 16 away from its rearward position. By this arrangement, when the coupling is not in use, one of the arms of yoke 15 is moved automatically into abutment with the tractor face and the coupling is thus moved out of the way, such position being shown in dot-dash lines in Figure 2. Preferably the rear face of the tractor has resilient bumpers 43, 44 to be engaged by the yoke arms.

In operation, the coupling may be engaged or disengaged with bar 12 by pivotal movement of lever 20 about its horizontal axis. The slotted connection of frame shanks 28, 29 on bearing studs 24, 25 provides automatic height adjustment of said coupling. The coupling may be angularly adjusted with respect to the rear face of the tractor by manually pivoting stem 16 about its vertical axis by turning lever 20 through a horizontal arc. Such angular adjustment makes it unnecessary to align or square the tractor with the truck in order to engage or disengage the coupling, besides providing flexibility in the connection necessary for steering the tow.

When the coupler is not in use and yoke 15 automatically swings to its out-of-the-way position, the coupler may be compacted further by manually raising frame 26 through lever 20 and securing these elements in raised position by engagement of detent 21 in the notch of rack 19.

It is seen that all of the manual operations of the coupling are performed by movement of a single operating lever accessible from the driver's position in the towing vehicle. Thus the improved coupling of the present invention facilitates and simplifies towing by making unnecessary any awkward engaging or disengaging of the coupling.

While I have shown and described only a single embodiment of the invention, it is apparent that modifications may arise without departing from the spirit of the invention. Therefore I do not wish to be limited by the disclosure set forth, but only by the scope of the appended claims.

I claim:

1. In a towing vehicle, a yoke mounted for pivotal movement on a vertical axis, a coupling frame pivoted to said yoke for movement on a horizontal axis for engagement or disengagement with a tow, a single operating lever, and means operatively connecting said lever with said yoke and said coupling frame for moving the yoke and coupling frame on their vertical and horizontal axes, respectively.

2. In a towing vehicle, a yoke mounted for pivotal movement on a vertical axis, a coupling frame pivoted to said yoke for movement on a horizontal axis for engagement or disengagement with a tow and being vertically movable with respect to the yoke to assume tow height, a single operating lever operable from the driver's position in the vehicle, and means operatively connecting said lever with said yoke and said coupling frame for moving the yoke and coupling frame on their vertical and horizontal axes, respectively.

3. In a towing vehicle, a yoke mounted for pivotal movement on a vertical axis, a coupling frame pivoted to said yoke for movement on a horizontal axis for engagement or disengagement with a tow, an operating lever operable from the driver's position in the vehicle, means operatively connecting said lever with said yoke and said coupling frame for moving the yoke and coupling frame on their vertical and horizontal axes, respectively, and spring means for automatically moving said yoke on its vertical axis for placing said coupling frame in an out-of-the-way position when not in use.

4. In a towing vehicle, a yoke, an upright hollow stem rigidly fixed to said yoke, bearing means mounting said yoke and stem for pivotal movement on a vertical axis, a coupling frame pivoted to said yoke for movement on a horizontal axis for engagement or disengagement with a tow, an operating lever pivoted to said stem and adapted to move said stem on its vertical axis, and flexible means operatively connecting said lever and said coupling frame and extending through at least a portion of said stem, whereby pivoted movement of said lever with respect to said stem moves said coupling frame on its horizontal axis.

5. In a towing vehicle, a yoke, an upright hollow stem rigidly fixed to said yoke, bearing means at the rear of the vehicle mounting said yoke and stem for pivotal movement on a vertical axis, a coupling frame pivoted to said yoke for movement on a horizontal axis for engagement or disengagement with a tow, the coupling frame assuming tow height on engagement with a tow, an operating lever pivoted to said stem and operable from the driver's position in the vehicle, said lever being adapted to move said stem on its vertical axis, and flexible means operatively connecting said lever and said coupling frame and extending through at least a portion of said stem, whereby pivotal movement of said lever with respect to said stem moves said coupling frame on its horizontal axis.

6. In a towing vehicle, a yoke, an upright hollow stem rigidly fixed to said yoke, bearing means mounting said yoke and stem for pivotal movement on a vertical axis, a coupling frame pivoted to said yoke for movement on a horizontal axis for engagement or disengagement with a tow, an operating lever pivoted to said stem and adapted to move said stem on its vertical axis, flexible means operatively connecting said lever and said coupling means and extending through at least a portion of said stem, and means for automatically moving said yoke on its vertical axis for placing said coupling frame in an out-of-the-way position when not in use.

7. In a towing vehicle, a tow engaging coupling frame, means mounting said coupling frame on the vehicle, said mounting means being pivotally movable on a vertical axis and said coupling frame being pivotally movable on a horizontal axis, movement of the coupling frame on its horizontal axis effecting engagement or disengagement with a tow, means operable from the driver's position in the vehicle for pivoting said mounting means on its vertical axis and said coupling frame on its horizontal axis, and spring means for automatically moving said mounting means about its vertical axis so that said coupling frame assumes an out-of-the-way position when not in use.

8. In a towing vehicle, a tow engaging coupling frame, means mounting said coupling frame on the vehicle, said mounting means being pivotally movable on a vertical axis and said coupling frame being pivotally movable on a horizontal axis, movement of the coupling frame on its horizontal axis effecting engagement or disengagement with a tow, said coupling frame also being vertically movable with respect to said mounting means for automatically assuming tow height on engagement with a tow, means for manually pivoting said mounting means on its vertical axis and said coupling frame on its horizontal axis, and spring means for automatically moving said mounting means about its vertical axis so that said coupling frame assumes an out-of-the-way position when not in use.

SILAS C. FONS.

REFERENCES CITED

The following references are of record in the file of this patent:

UNITED STATES PATENTS

| Number | Name | Date |
|--------|------|------|
| 901,701 | Gerling | Oct. 20, 1908 |
| 997,917 | Johnson et al. | July 11, 1911 |
| 1,013,894 | Pearson | Jan. 9, 1912 |
| 1,091,990 | Watts | Mar. 31, 1914 |
| 1,541,812 | Highducheck | June 16, 1925 |
| 1,542,093 | Raymond | June 16, 1925 |